US009378598B2

(12) United States Patent
Dumas et al.

(10) Patent No.: US 9,378,598 B2
(45) Date of Patent: Jun. 28, 2016

(54) WIRELESS ACCESS CONTROL SYSTEM AND RELATED METHODS

(71) Applicant: UNIKEY TECHNOLOGIES, INC., Winter Park, FL (US)

(72) Inventors: Philip C. Dumas, Orlando, FL (US); Thomas Bennett, Orlando, FL (US)

(73) Assignee: UNIKEY TECHNOLOGIES INC., Orlando, FL (US)

( * ) Notice: Subject to any disclaimer, the term of this patent is extended or adjusted under 35 U.S.C. 154(b) by 0 days.

(21) Appl. No.: 14/681,263

(22) Filed: Apr. 8, 2015

(65) Prior Publication Data

US 2015/0211259 A1 Jul. 30, 2015

Related U.S. Application Data

(60) Division of application No. 13/734,671, filed on Jan. 4, 2013, now Pat. No. 9,057,210, which is a continuation-in-part of application No. 13/415,365, filed on Mar. 8, 2012.

(60) Provisional application No. 61/453,737, filed on Mar. 17, 2011.

(51) Int. Cl.
*G05B 19/00* (2006.01)
*G08B 21/00* (2006.01)
(Continued)

(52) U.S. Cl.
CPC ............ *G07C 9/00015* (2013.01); *E05B 47/00* (2013.01); *G07C 9/00103* (2013.01);
(Continued)

(58) Field of Classification Search
CPC ........... G07C 9/00174; G07C 9/00309; G07C 9/00111; G07C 9/00103; G07C 9/00571; G07C 2209/04; G07C 2209/64; G07C 2009/00365; G07C 2009/00785; G07C 9/00182; G07C 2009/00793; E05B 47/00; H04W 12/06; H04L 63/0428; H04L 63/0492
USPC .................. 340/5.61, 5.64, 5.71, 5.2, 426.28, 340/539.11, 542, 825.31, 572.9; 455/414.1, 455/556.1; 70/9, 21, 277, 278.1; 726/17, 19
See application file for complete search history.

(56) References Cited

U.S. PATENT DOCUMENTS 6,072,402 A 6/2000 Kniffin et al.
6,236,333 B1 5/2001 King
(Continued)

FOREIGN PATENT DOCUMENTS

CN 101532353 9/2009
JP 2000145222 5/2000
(Continued)

OTHER PUBLICATIONS

Dumas et al., U.S. Appl. No. 14/681,243, filed Apr. 8, 2015.
(Continued)

*Primary Examiner* — Mirza Alam
(74) *Attorney, Agent, or Firm* — Allen, Dyer, Doppelt, Milbrath & Gilchrist, P.A.

(57) ABSTRACT

A wireless access control system includes a remote access device and an electronic lock. The electronic lock communicates with the remote access device. The electronic lock controls the ability to lock and unlock a door in which the electronic lock is disposed. The electronic lock determines when the remote access device is at a distance less than or equal to a predetermined distance from the lock to enable the lock to be unlocked.

14 Claims, 15 Drawing Sheets

(51) Int. Cl.
*G05B 23/00* (2006.01)
*G07C 9/00* (2006.01)
*E05B 47/00* (2006.01)

(52) U.S. Cl.
CPC ........ *G07C9/00111* (2013.01); *G07C 9/00182* (2013.01); *G07C 9/00309* (2013.01); *G07C 9/00571* (2013.01); *G07C 2009/00793* (2013.01); *G07C 2209/04* (2013.01); *G07C 2209/64* (2013.01)

(56) References Cited

U.S. PATENT DOCUMENTS

| | | | | | |
|---|---|---|---|---|---|
| 7,173,516 | B2 | 2/2007 | Mullet et al. | | |
| 7,701,331 | B2 | 4/2010 | Tran | | |
| 2002/0013909 | A1 | 1/2002 | Baumeister et al. | | |
| 2003/0189481 | A1* | 10/2003 | Hamid | G07C 9/00563 | 340/5.53 |
| 2003/0222758 | A1 | 12/2003 | Willats et al. | | |
| 2006/0164208 | A1* | 7/2006 | Schaffzin | G07C 9/00182 | 340/5.64 |
| 2008/0018437 | A1 | 1/2008 | Reichling et al. | | |
| 2008/0117176 | A1 | 5/2008 | Ko et al. | | |
| 2008/0231433 | A1 | 9/2008 | McBride et al. | | |
| 2008/0238610 | A1 | 10/2008 | Rosenberg | | |
| 2009/0002153 | A1 | 1/2009 | Berstis et al. | | |
| 2009/0066476 | A1* | 3/2009 | Raheman | G07C 9/00103 | 340/5.64 |
| 2010/0052931 | A1 | 3/2010 | Kolpasky et al. | | |
| 2010/0059231 | A1 | 3/2010 | Thomas et al. | | |
| 2010/0164683 | A1 | 7/2010 | Sharma et al. | | |
| 2010/0201536 | A1* | 8/2010 | Robertson | G07C 9/00904 | 340/686.6 |
| 2010/0245038 | A1 | 9/2010 | Ghabra et al. | | |
| 2010/0306549 | A1 | 12/2010 | Ullmann | | |
| 2011/0016971 | A1* | 1/2011 | Yulkowski | E05F 15/20 | 73/493 |
| 2011/0223868 | A1 | 9/2011 | Kojima et al. | | |
| 2012/0234058 | A1 | 9/2012 | Neil et al. | | |
| 2012/0258681 | A1 | 10/2012 | Hanover | | |
| 2012/0280783 | A1* | 11/2012 | Gerhardt | G07C 9/00309 | 340/5.6 |
| 2013/0176069 | A1* | 7/2013 | Leong | B60R 25/24 | 327/517 |
| 2013/0176107 | A1 | 7/2013 | Dumas et al. | | |
| 2013/0237193 | A1 | 9/2013 | Dumas et al. | | |
| 2013/0241694 | A1 | 9/2013 | Sharma et al. | | |
| 2014/0077929 | A1 | 3/2014 | Dumas et al. | | |
| 2014/0292481 | A1 | 10/2014 | Dumas et al. | | |

FOREIGN PATENT DOCUMENTS

| | | |
|---|---|---|
| JP | 2003262072 | 9/2003 |
| KR | 1020030083538 | 10/2003 |
| KR | 20040093937 | 11/2004 |
| KR | 20050005786 | 1/2005 |
| KR | 1020080086623 | 9/2008 |
| KR | 2020100001206 | 2/2010 |
| WO | 2011159921 | 12/2011 |
| WO | 2012064263 | 5/2012 |

OTHER PUBLICATIONS

Dumas et al., U.S. Appl. No. 14/681,281, filed Apr. 8, 2015.

* cited by examiner

Activation Range: ~ 3 feet away
In-signal range: Maximum distance for communication

WIRELESS ACCESS CONTROL SYSTEM AND RELATED METHODS

CROSS REFERENCE TO RELATED APPLICATION(S)

This application is a divisional of copending U.S. application Ser. No. 13/734,671, filed Jan. 4, 2013, which is a continuation-in-part of copending U.S. application Ser. No. 13/415,365, filed Mar. 8, 2012, which claims the benefit of Provisional Patent Application No. 61/453,737, filed Mar. 17, 2011, the entire contents of all of which are hereby incorporated by reference.

FIELD OF THE INVENTION

The present invention generally relates to access control systems, and more particularly, to wireless access control systems for door locks.

BACKGROUND

A passive keyless entry (PKE) system offers an increased level of convenience over a standard lock and key, for example, by providing the ability to access a secure building or device without having to find, insert, and turn a traditional key. A user may simply approach and touch a locked PKE lock and with little if any pause, the lock grants this user access if they are carrying an authorized token.

A PKE system is currently used in an automotive application and may offer increased convenience by identifying drivers and unlocking the car as they approach and grab the handle. Automotive access is traditionally given by inserting a key into the lock or by pushing buttons on a traditional remote keyless entry (RKE) system. In contrast, a PKE system grants access with reduced user interaction through the use of a hands free token carried by the driver.

Several technical challenges have been encountered during the engineering of a radio frequency (RF) PKE system, for example, for use in a residential lock. The desired basic perceived behavior of the PKE system in a residential application may be as follows: 1) the user approaches and touches the lock; 2) the lock authenticates the user with a minimally perceived delay; 3) the lock unlocks; 4) the lock may not operate if the authorized user is outside a desired range and the lock is touched by another, unauthorized, user; 5) the lock may not operate if the authorized user is on the inside of the house, and the lock is touched on the outside by an unauthorized user; and 6) the battery powered lock needs several months or more worth of battery life to prevent inconvenient and costly battery changes. 7) if a PKE fob is used, battery power needs to be over a year. 8) the lock can provide anytime, or configurable limited time, access control. 9) the lock has the ability to be locked without a remote access device Indeed, as will be appreciated by those skilled in the art, with respect to the above desired basic perceived behavior of the PKE system in a residential application, primary challenges to be addressed include items 1 (Simplicity), 2 (speed), 4 (distance), 5 (location), 6-7 (battery life), and 8-9 (convenience). Accordingly, it may be desirable to improve authentication speed, proximity measurement, location determination, decrease power consumption, and increase convenience for example.

SUMMARY OF THE INVENTION

A wireless access control system includes a remote access device for authorizing access control to a lock when present on a user who touches, or triggers a proximity detector, of the lock.

A wireless access control system includes a remote access device for authorizing access control to a lock when the user possessing the authorized remote access device is within an activation range of the lock and door. If the authorized user is outside of activation range, signal range, or inside the lock and door, the remote access device will not be enabled to lock or unlock the door.

A wireless control system includes a remote access device for accessing a lock. The remote access device includes a controller and radio signal generator. A battery powers the controller and radio signal generator. An accelerometer provides an acceleration signal to the controller in response to sensed acceleration. The radio signal generator outputting a radio signal for a predetermined time period in response to an acceleration signal via the controller. In a preferred embodiment, an authentication circuit provides an input to the controller for encryption and authentication purposes which are carried by the radio signal to the lock.

In another embodiment, the remote access device can be a Smartphone. In another embodiment, additional haptic feedback can be utilized to control the electronic lock. A user can tap the remote access device if within activation range to cause a larger acceleration trigger which can be captured by the controller and sent to the lock via a radio signal to lock or unlock the electronic lock in response.

In another embodiment, a lock includes a controller and radio signal transceiver to communicate with an electronic lock for controlling the electronic lock in response to the signal from the remote access device. The lock includes an accelerometer for determining movement, such as a knock or the door opening, in which the lock is disposed and controlling the radio or the electronic lock via the controller as a function of the acceleration signal.

In another embodiment, a real time clock provides a clock input to the controller, the controller allowing for configurable access control of the electronic lock as a function of the time indicated by a signal from the real time clock. The controller operating on the real time clock signal can permit anytime, limited time, recurring time windows, or one-time use access for example.

In another embodiment, a proximity detector which detects the presence of a user at or near the lock provides a proximity detection signal to the controller and radio for permitting control of the electronic lock in response to a signal from a remote access device when the proximity of a user is detected. In one embodiment, the proximity detector may be a touch sensor disposed within the lock or a trip light detector. In one embodiment, the trip light detector is located at the bottom of a deadbolt lock facing downwards towards the handle so when a user grabs the handle of the door the light detector is tripped and the deadbolt controller can initiate the desired action, for example unlocking the deadbolt.

In another embodiment, the proximity detector can be intentionally triggered "n" times in a row within a predetermined time period, or be continuously held for a predetermined time period (the time period preferably being ten or fewer seconds) to trigger a lock event without a remote access device being present.

In another embodiment, the proximity detector which detects the presence of a user at or near the lock provides a proximity detection signal to the controller and radio to turn on or change the state of the radio in order to make a connection with an authorized remote access device and lock or unlock the electronic lock. In a preferred embodiment, the proximity detection activates the radio into a listening state for a limited period of time to listen for remote access devices advertisements. This listening state requires more power there for it is desirable to only go into this state for a limited period of time upon user detection.

In another embodiment, the lock is already communicating with an authorized remote access device and the proximity detector which detects the presence of a user at or near the lock provides a proximity detection signal to the controller to lock or unlock the electronic lock.

DETAILED DESCRIPTION OF THE INVENTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Figure 1:
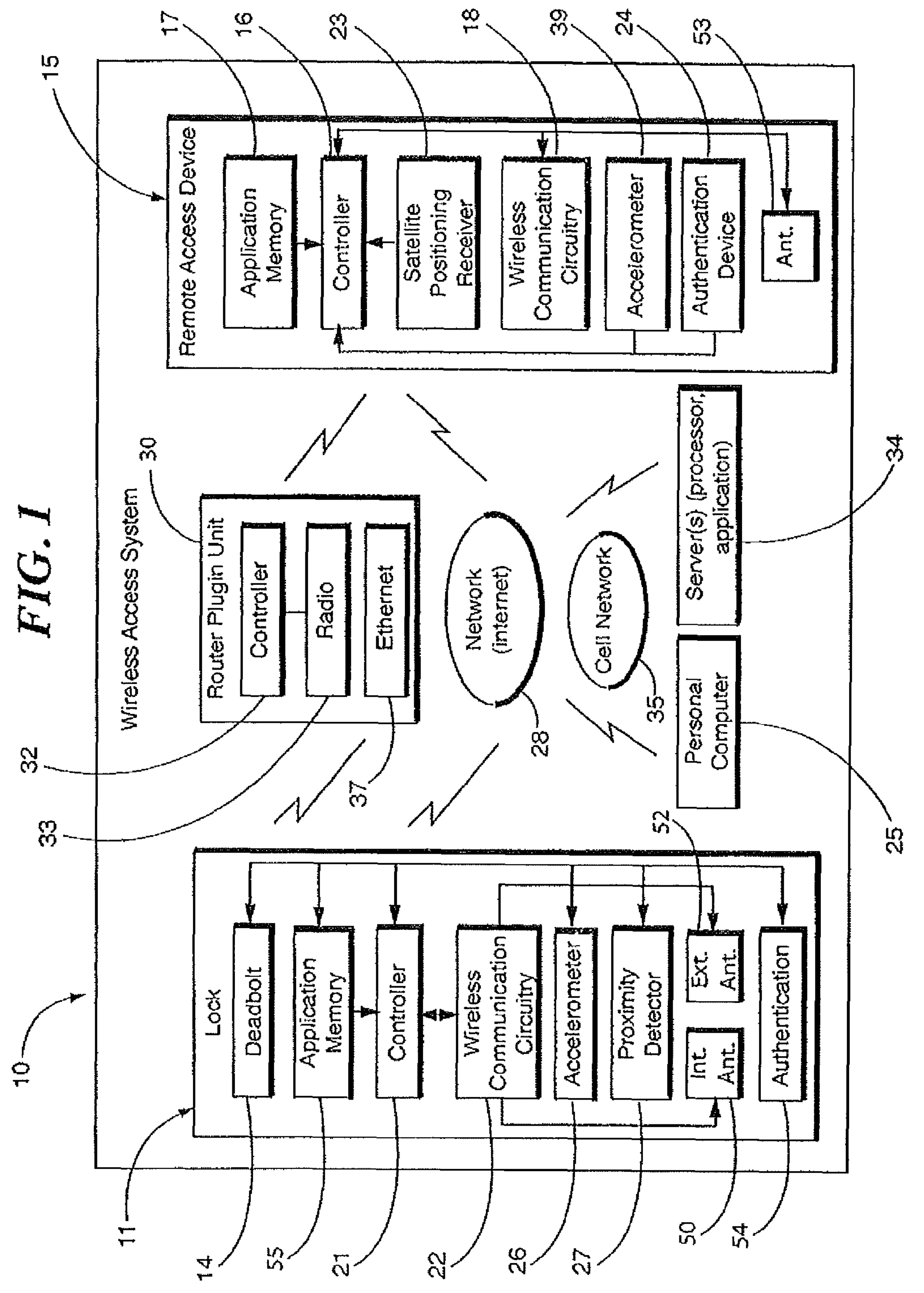
FIG. 1 is a schematic diagram of a wireless access system according to the present invention.
Figure 2A:
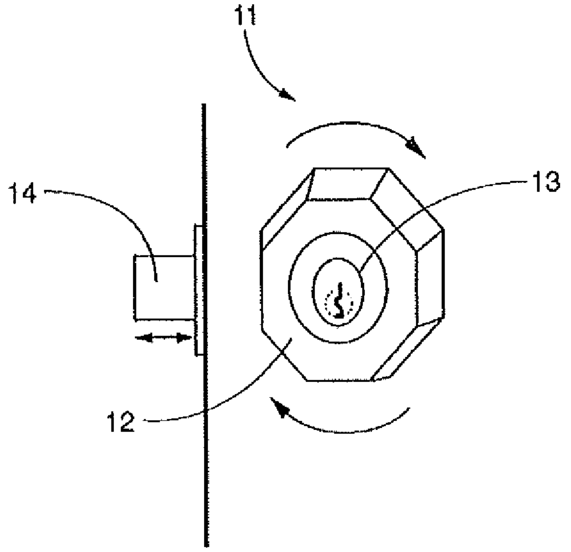
FIG. 2*a* is a perspective view of a lock constructed in accordance with the invention.

Referring to FIGS. 1, 2*a*, 2*b*, 3*a*, 3*b*, and 4, a wireless access system 10, for example, a PKE system, includes a lock 11. The lock 11 may be installed in a standard deadbolt hole and may be battery powered, for example. The lock 11 may be a human controlled (keyed) lock, for example (FIG. 2*a*). The lock 11 includes an outer cylinder 12 that rotates freely around a standard key cylinder 13. When engaged, the cylinder 13 is linked to a deadbolt 14 (which may optionally be part of lock 11), thus giving the user control to extend or retract the deadbolt utilizing their key. The lock 11 includes a controller 21 or processor and wireless communication circuitry 22 for wireless communication which as will be discussed below, enable remote access device 15 to operate lock 11.

Figure 2B:
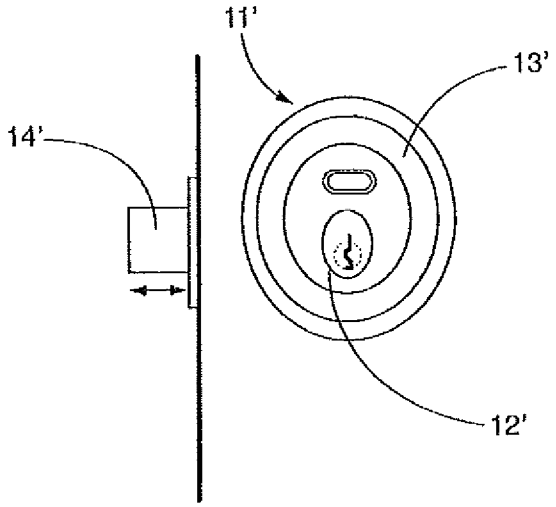
FIG. 2*b* is a perspective view of a lock constructed in accordance with another embodiment of the invention.

Alternatively, in another embodiment, the lock 11' may be motor powered (FIG. 2*b*). When a user is in sufficiently close vicinity or touches anywhere on the lock, or in proximity of the lock, 11', the deadbolt 14' is driven by the motor (not shown) to open the lock for authorized users having the remote access device 15. Of course, the lock 11 may be another type of lock or locking mechanism and may be installed in any access point, for example.

Lock 11 includes a proximity detector 27 for detecting the presence of a user. Proximity detector 27 outputs a presence signal in response to detecting a user. As discussed below, proximity detector 27 may be a capacitance touch sensor, a button, a trip light circuit, a near field detector, a radio frequency signal strength detector, an audio switch (which actuates upon receipt of audio signals of a set frequency), or the like. Proximity detector 27 outputs the presence signal to controller 21.

In one non-limiting exemplary embodiment, lock 11 is in a hibernation or low power level state. Upon triggering a proximity detector 27 outputting the presence signal by a users touch for example, controller 21 causes system 10 to wake up and start listening for remote access devices 15 advertisements. Upon finding a remote access device 15, the lock 11 communicates with (connects) to the remote access device 15, determines if the device 15 is an authorized user via an encrypted key exchange, then determines if the remote access device 15 is in range to control the lock 11, and ultimately provides access to an authorized user; all within a short or small perceived delayed time (ten seconds or less) if all the criteria is met.

Additionally, the lock 11 may be advertising or listening (sending or sampling signals) at a low frequency rate in order to conserve battery power yet establish a communication link with the remote access device 15 in advance of a users touch. In this way, increasing the speed of the authentication process to create little if any perceived delay for the user.

In another embodiment, once the lock 11 is touched by a user, the lock wireless communication circuitry 22 changes states and starts listening for a remote access device 15 advertisement. Once a connection is made authentication can be done upon connection, or upon lock or unlock request from remote access device 15. Once authenticated, the lock 11 tracks the Received Signal Strength Indicator (RSSI) of the remote access device until the algorithm determines it is within a defined accessible range from lock 11. The lock 11 gathers RSSI data and utilizes this data in an algorithm to determine the position of the remote access device 15. Once the remote access device 15 is within a pre-determined accessible distance (control range), the lock grants remote access device 15 access control to lock or unlock the lock 11. Additional antennas may be used in some embodiments for more accurate position determining, and to increase authorized user capacity and overall speed of the wireless access system 10, Alternatively, in another embodiment, the lock may be a doorknob lock, handle lock, or other style lock for example.

Figure 3A:
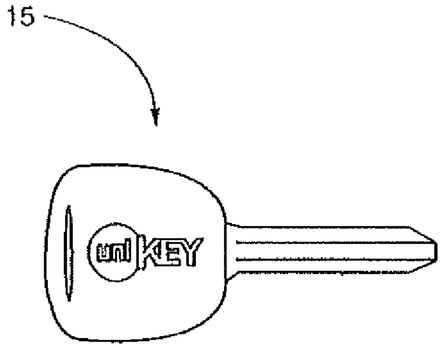
FIG. 3*a* is a top plan view of a remote access device constructed in accordance with the invention as a key.

Referring now additionally to FIG. 3, the wireless access system 10 includes a remote access device 15. The remote access device 15 is advantageously a key or token authorized to control the lock 11. In particular, the remote access device 15 may be a standard key including a controller 16 for controlling lock 11 via remote wireless access electronics coupled thereto (FIG. 3*a*). Remote access device 15 also includes wireless communication circuitry radio 18 such as a radio in one non-limiting embodiment, for sending and receiving signals. In a preferred non-limiting example, the signal is a Bluetooth Low Energy signal.

Figure 3B:
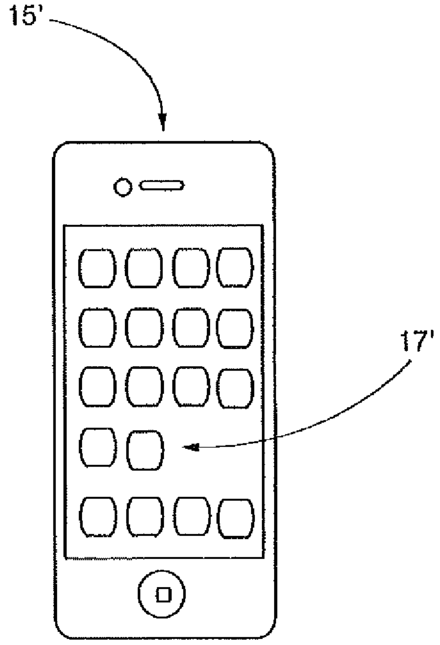
FIG. 3*b* is a front plan view of a remote access device constructed in accordance with yet another embodiment of the invention as an application for a cell phone.

Alternatively, or additionally, the remote access device 15 may be a mobile wireless communications device, such as, for example, a Smartphone that may include the remote wireless access electronics described above cooperating with an application 17' stored in memory 17 (FIG. 3*b*). The application 17' may be configured to send a signal to provide access and control over the lock 11', for example. Of course, more than one remote access device 15' may be used and may be another type of remote access wireless device, for example, a wireless FOB without the mechanical key, as will be appreciated by those skilled in the art.

Figure 4:
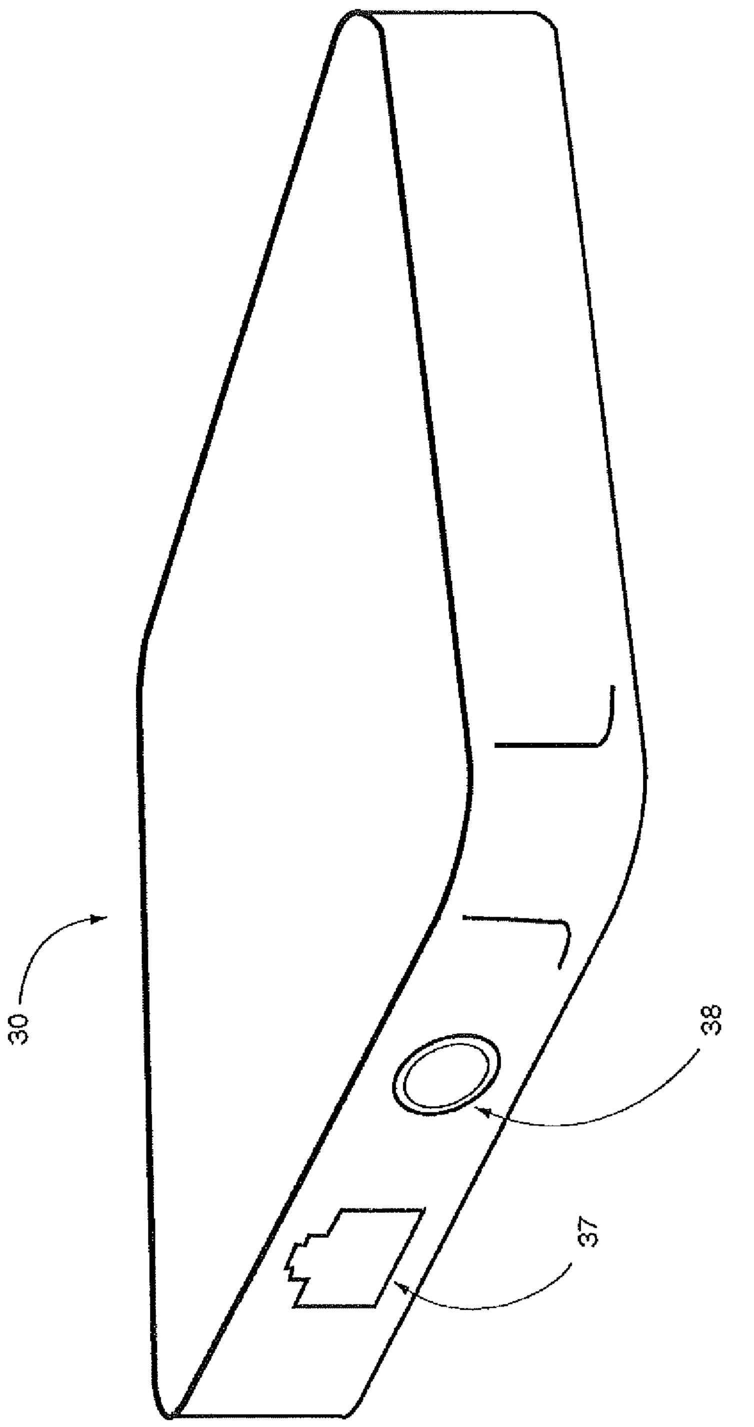
FIG. 4 is a front plan view of a Router Plug-in Unit of the wireless access system constructed in accordance with the invention.

Referring now additionally to FIG. 4, the wireless access system 10 also includes a Router Plug-in Unit (RPU) 30. Connected to mains power via a power source plug-in 38 and the Internet via a Ethernet port 37 to the home Touter. A controller 32 controls operation of RPU 30. In one embodiment, the RPU 30 includes a radio transceiver 33 to communicate with lock 11 and/or remote access device 15, and utilizes a Bluetooth Low Energy communication protocol to communicate with the lock 11.

The RPU 30 may link to an off-site web-based server 34 via a communications network such as the internet 28, for example. This advantageously enables RPU 30 to receive near real time updates for adding or removing users, one-time access, extended access or specific timed access, and other connectivity related updates and functions at lock 11, as will be appreciated by those skilled in the art. In addition, the RPU 30 can send lock 11 status and transaction updates via the Internet 28 to the server 34 which can be viewed on a remote access device 15 or personal computer 25, for example. Additional services may be selectively provided via the Internet using the connectivity of RPU 30 with server 34, for example. While the RPU 30 is described herein as a plugin device, it will be appreciated by those skilled in the art that the functionality of the RPU 30 may be embodied in any of a number of form factors, for example, such as a mobile cellular based unit making use of cell network 35.

Figure 5:
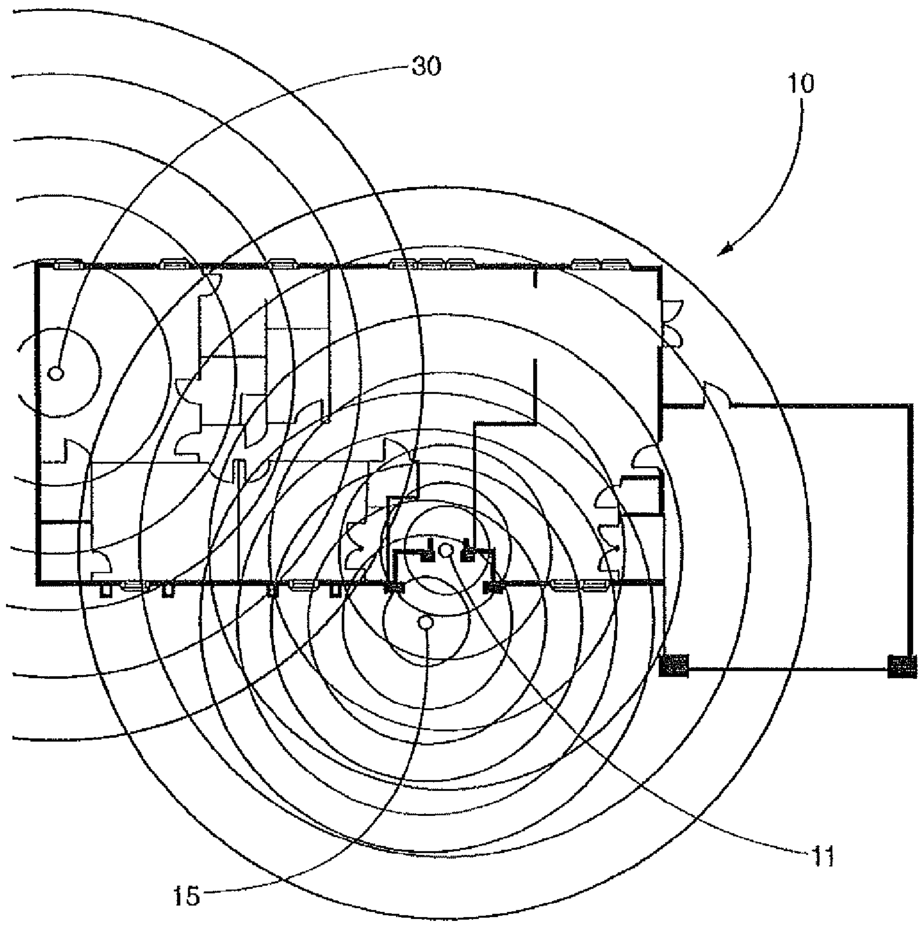
FIG. 5 is a schematic diagram of the communication between the components of the wireless access system in a typical residential system layout in accordance with the invention.
Figure 6A:
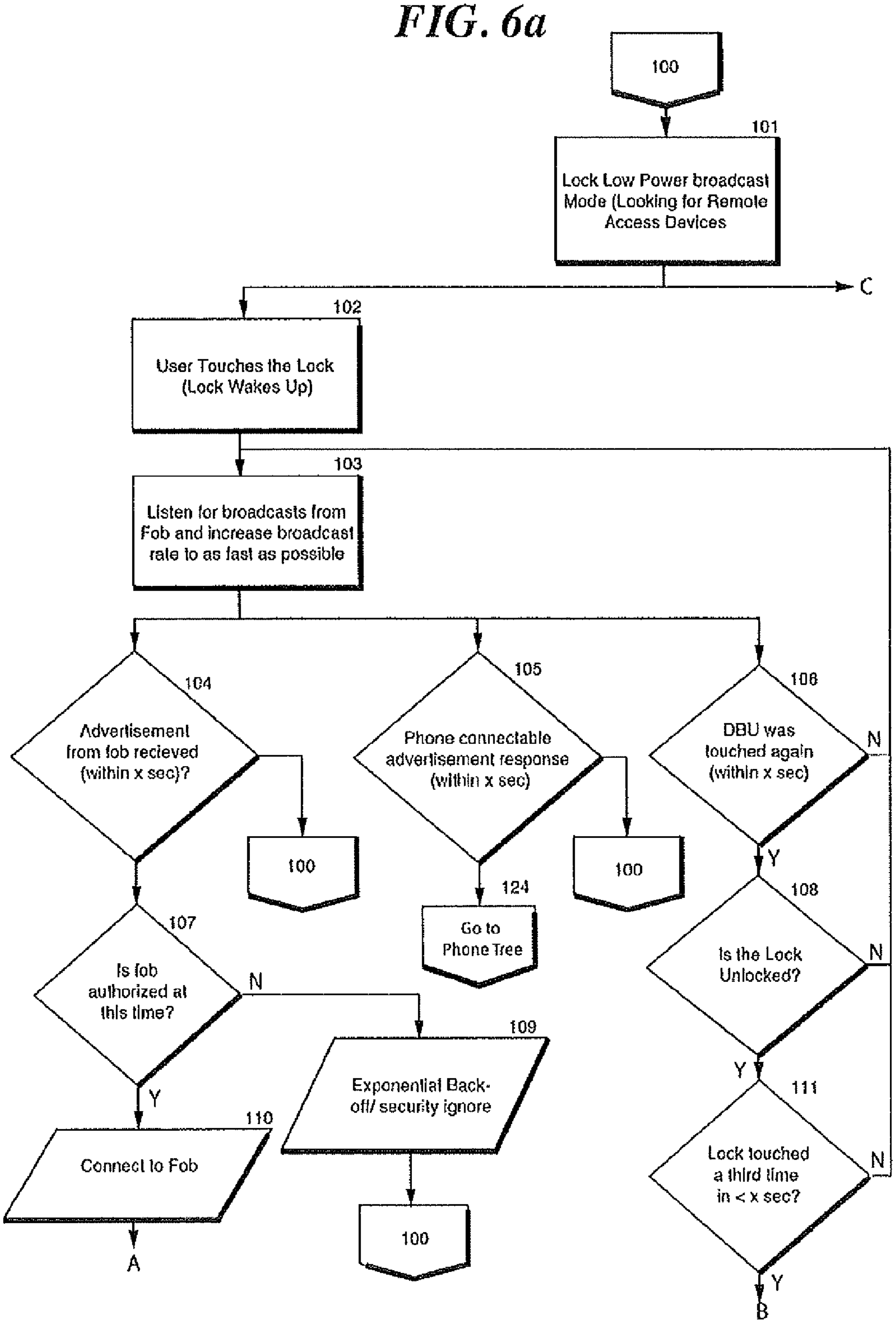
FIG. 6*a*-6*d* are a flow chart of operation of the wireless access system in accordance with the invention.
Figure 6B:
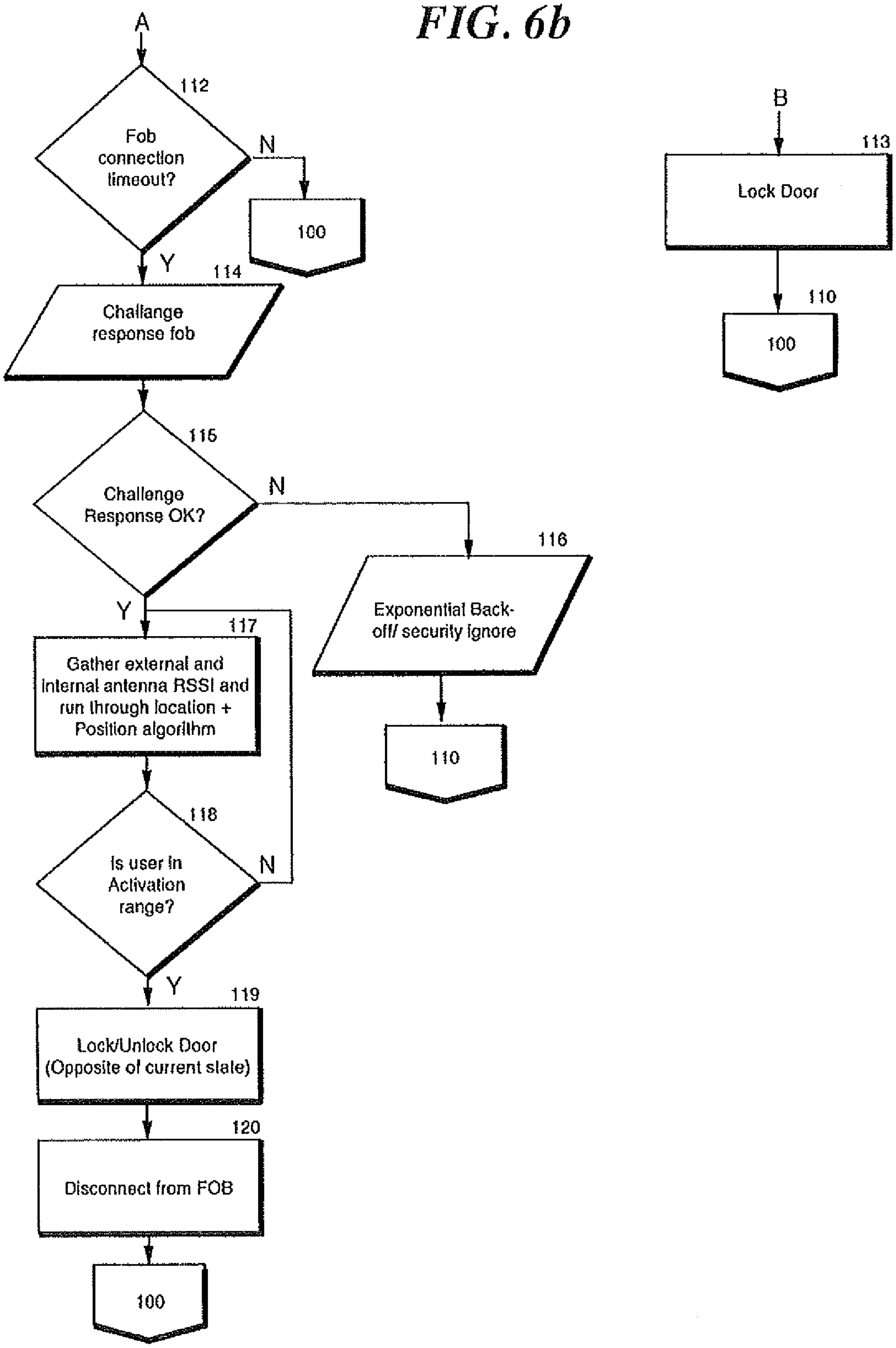
Figure 6C:
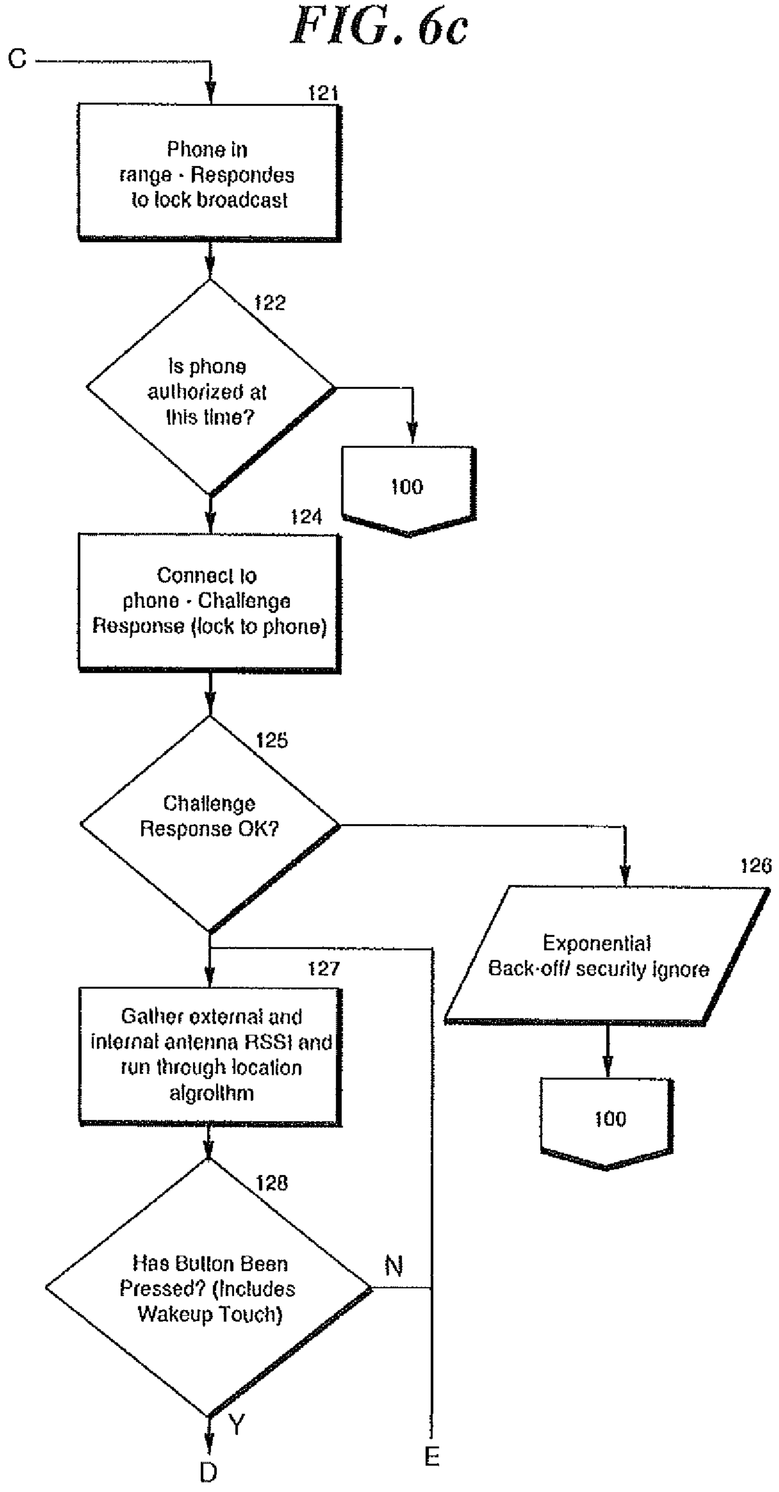
Figure 6D:
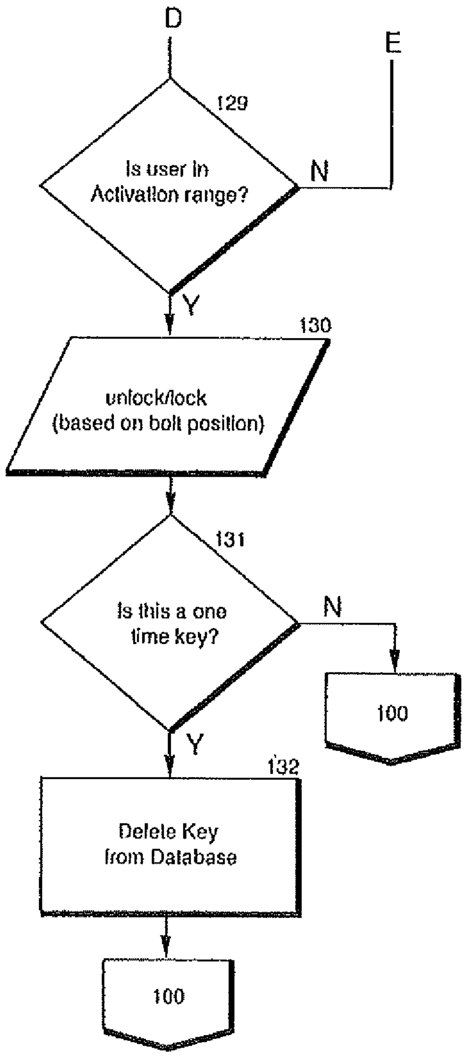

Referring now additionally to FIG. 5, a typical residential setup example of the wireless access system 10 is illustrated. As described above with respect to FIG. 4, the RPU 30 is typically plugged-in to the mains power via power source plug-in 38 and to the internet 28 via the home router though an Ethernet cable and port 37, at a location near the home router. RPU 30 may also communicate wirelessly to the lock 11, which may be installed on the front door, for example.

Operation of the wireless access system 10 will now be described with reference additionally to the flowchart in FIG. 6*a*-6*d*. The lock 11, may initially be in a low power mode in a step 101 to conserve battery power, for example. The lock 11 is typically in a low power mode; searching for authorized remote access devices 15', for example a Smartphone, at a lower frequency to conserve battery power. In one preferred non-limiting embodiment, when a user triggers the proximity detector 27 by touch in a Step 102, or another method, the lock 11 begins to listen for remote access devices 15 in a Step 103, more specifically fobs in this embodiment. At the same time, system 10 powers up and controller 2 increases its broadcast and listening rate.

If lock 11 "sees" (receives) an advertisement from a fob 15 within a predetermined time period in a Step 104, and the fob 15 is authorized for access at that time as determined by lock 11 in a step 107, a connection is made between fob 15 and lock 11 in a step 110. It is then determined whether fob 15 is still connected by determining whether communication has occurred within a predetermined time period in a Step 112.

If the fob 15 has not timed out, then in a Step 114 a lock 11 performs a challenge response verification process to authenticate the remote access device 15. If fob 15 is verified by comparing an identification portion of the advertisement signal to information stored at system 10, lock 11 begins to gather and process location and positioning data of fob 15 in a step 117 utilizing Received Signal Strength Indication (RSSI) by way of non-limiting example. Utilizing the location and positioning algorithm in step 117, lock 11 can determine if the user is within activation range in step 118. If the user is in the activation range as determined in step 118, the control of lock 11 is given to fob 15 and the lock 11 will lock or unlock as needed in a step 119, then the lock 11 disconnects from fob 15 in a step 120 and returns to step 100 to its low power state 101.

If in Step 104 the advertisement from the fob 15 is not received within a predetermined time window or the fob is not authorized as determined in Steps 107 and a Step 109 in which the signal is ignored, or the fob connection times out in a Step 112, or the challenge response in Step 115 is not an appropriate one, then the process returns to Step 100 to be repeated.

In another embodiment, controller 21 can enable locking the door without the use of fob 15. If proximity detector 27, which may include a touch sensor, determines that lock 11 was touched at least a second time within a time window, preferably measured in seconds, in a Step 106, then controller 21 determines whether lock 11 is unlocked in a step 108. If it is determined that lock 11 is in fact unlocked in Step 108, then it is determined whether or not or not the lock 11 is touched a third time within a predetermined time window measured in seconds or less, and if in fact the lock 11 is touched three times within the time window, then controller 21 causes lock 11 to lock bolt 14 in a Step 113 and the process is returned to the beginning in Step 100 to monitor for another remote access device 15. If the deadbolt is not touched the prescribed number of times during the time window, in Steps 106 and 111, or is already in the locked state as determined in Step 108, then the process returns to Step 100 to await connection with another remote access device. In this way, a door can be locked merely by activating proximity detector 27, a predetermined number of times within a predetermined time period, or by continuously activating proximity detector 27 for a predetermined time period.

In another embodiment, the system may work without the need to touch lock 11 in step 102. In this embodiment, lock 11 and remote access device 15 determine that they are within range of each other to begin processing without the need to initially touch lock 11. This allows for the control of lock 11 well ahead of being sufficient proximity of a door to touch lock 11.

In this preferred non-limiting embodiment, an in-range remote access device 15', such as a Smartphone, responds in a Step 121 to a broadcast advertisement from the lock 11 in a Step 121 by controller 21. If the Smartphone 15' is authorized for access at that time as determined by controller 21 in a Step 122, a connection is made in a Step 124 between a Smartphone 15' and lock 11. If Smartphone 15' is authenticated during a challenge response verification process in Step 125, lock 11 begins to gather and process location and positioning data in a Step 127, utilizing RSSI or a signal from Global Positioning System (GPS) enabled Smartphone 15, for example. Utilizing the location and positioning algorithm in Step 127, the lock 11 can determine if the user is in activation range in a Step 129. In an optional Step 128, lock 11 may determine whether lock 11 has been touched prior to determining whether the user is in range in Step 129. If the user is in activation range, lock 11 will lock or unlock (reverse state) in a Step 130.

In another embodiment, information about remote access device 15' may be stored at any one of memory 55, and memory associated with personal computer 25 or server 34. Remote access device 15 may have limited access to lock 11. By way of example, access may only be during predetermined time periods of a day, or for a limited number of times; such as a one-time use key. If the remote access device 15', represents a one-time key as determined in Step 131, this key will be deleted from the memory or stored in the memory of system 10 as an invalid key in Step 132 to prevent further access.

As with touch process, in this proximity determination process at any time controller 21 or 32 determines that the response is inappropriate (Step 125), or remote access device 15 is not a one-time key (131) the process is returned to Step 100 to begin again. However, if the button has not been pressed in Step 128 then the process merely returns to redetermining the location of remote access device 15 in Step 127.

A hybrid approach is also possible. In a Step 105, once it is determined that the lock has been touched in Step 102 and lock 11 listens for a broadcast from fob 15 in Step 103, if a lock 11 determines in a step 105 that a Smartphone connectable advertisement response has been received within a predetermined time window; five seconds or less in a preferred embodiment, the process continues for Smartphone 15' at Step 124 as described above. If the response is not appropriate, as determined Step 105, then the process returns to the beginning in Step 100.

In another preferred non-limiting embodiment, the location and positioning algorithm performed in a Step 127 can utilize RSSI in formation from the lock 11 to the remote access device 15'. This can be done by the remote access device 15' receiving RSSI information from the lock 11 and transmitting this RSSI information back to the lock 11 to be processed by controller 21 for location and positioning purposes.

In another preferred non-limiting embodiment, any unauthorized user can lock the lock 11 by triggering the proximity detector three consecutive times within a predetermined time window such as discussed above in Step 106. In another possible embodiment, the lock 11 can be touched and held for greater than a predetermined time to lock the lock 11.

In another preferred non-limiting embodiment, only remote access devices 15 looking for a unique advertisement from the lock 11 will respond with a connectable advertisement. In this way, the system can provide access control to many possible authorized devices without adding additional delays per additional authorized devices.

In another embodiment in which the remote access device 15' is a Smartphone, tablet, or similar device, the lock 11 may also request the user to verify their access control request by requiring the transmittal of a PIN, Password or other authentication code. Lock 11 transmits a signal prompting the users, on their remote access device 15', for example, via a display on their mobile wireless communications device to answer with a PIN. Controller 21 compares the received password to authentication code previously stored by user at system 10, prior to enabling control of lock 11. This can be done to add additional security or to assist with inconclusive positioning or location information.

Figure 7A:
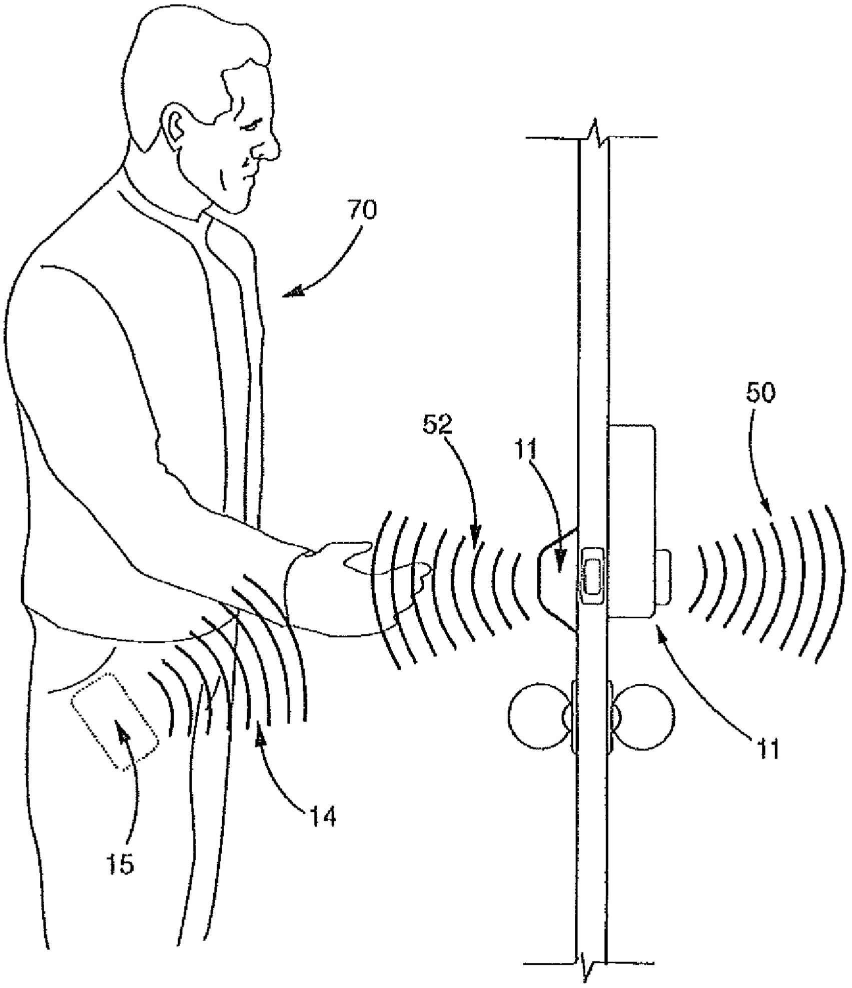
FIG. 7*a* is a diagram of a system showing the local communication between the remote access and the lock in accordance with the invention.
Figure 7B:
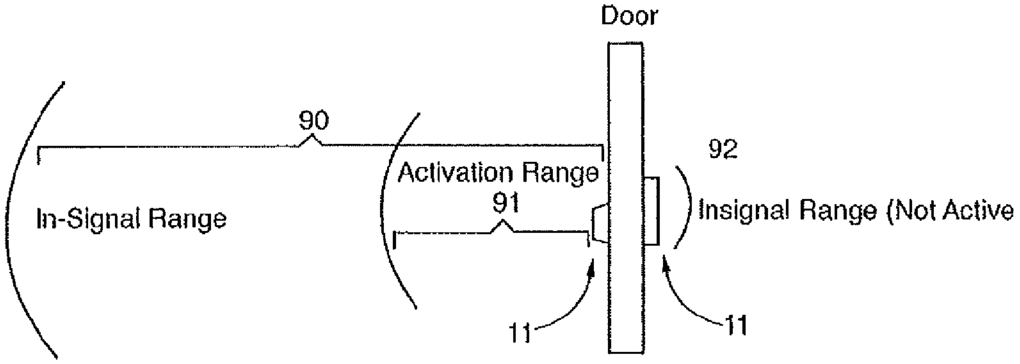
FIG. 7*b* is a diagram of a system showing range and location determination in accordance with the invention.

Referring now additionally to FIGS. 7*a* and 7*b*, a user 70, carries a remote access device 15', a Smartphone in their pocket for example. Assume the remote access device 15' is positioned within in-signal range 90. In this case, a wireless connection is made between the remote access device 15' and the lock 11. The remote access device 15' is authorized to control the lock 11.

In one non-limiting embodiment, when the user 70 approaches, their position is determined by receiving signals from remote access device 15' at an exterior facing antenna 52. Once user 10 is within activation range 91, and touches the lock 11, the lock 11 radio switches to an internal antenna 50 to verify the user 70 is on the outside. If the calibrated RSSI, as determined by controller 21, or some other element of system 10, from one or more readings from the internal antenna 50 is less than the external calibrated RSSI reading or readings, user 70 is determined by controller 21 to be on the outside and the lock 11 will lock or unlock. If the calibrated RSSI from the internal antenna 50 is greater than the RSSI reading or readings from external antenna 52, user 70 is determined to be on the inside, within inside range 92 by controller 21, and the lock 11 will not operate as to prevent unauthorized entry.

The wireless access system 10 may include a calibration feature. More particularly, a connection between the remote access device 15' and the lock 11 may be used by the algorithm to calibrate the RSSI input to adjust for varying antenna characteristics of remote access devices 15' or changes in user behavior or environmental conditions, for example. In one non limiting example, the lock 11 determines RSSI values for remote access devices 15' unlocking and locking events over a number of distinct communications. It then determines a maximum average activation range 91 value to calibrate with.

In another non limiting embodiment, the lock 11 can request that the remote access device 15' send its RSSI values as received from the lock 11 and utilize these to calibrate for remote access device 15' antenna differences. In another embodiment, the calibration is continuously self-adjusting per the last “n” number of access control events as to adjust for user behavioral changes or local condition changes over time.

The wireless access system 10 may also include a computing device 25, for example, a personal computer at the user’s residence for use in a revocation process by way of example. The computing device 25 may include circuitry for wirelessly communicating with the RPU 30, remote access device 15, and/or lock 11 for revoking a permission from remote access device 15. For example, the computing device 25 may include Bluetooth Low Energy communications circuitry, for example. Other devices and communications protocols may be used in the revocation process.

While the wireless access system 10 is described herein with respect to a door, the wireless access system may be used for access control or protection of, but not limited to, appliances, a safe, heavy machinery, factory equipment, power tools, pad locks, real estate lock-boxes, garage door openers, etc., for example. Alternative remote access device 15 embodiments may include a pen, watch, jewelry, headset, FDA, laptop, etc., for example. The wireless access system 10 may be used to protect other devices or areas where it may be desired to restrict access.

Figure 8:
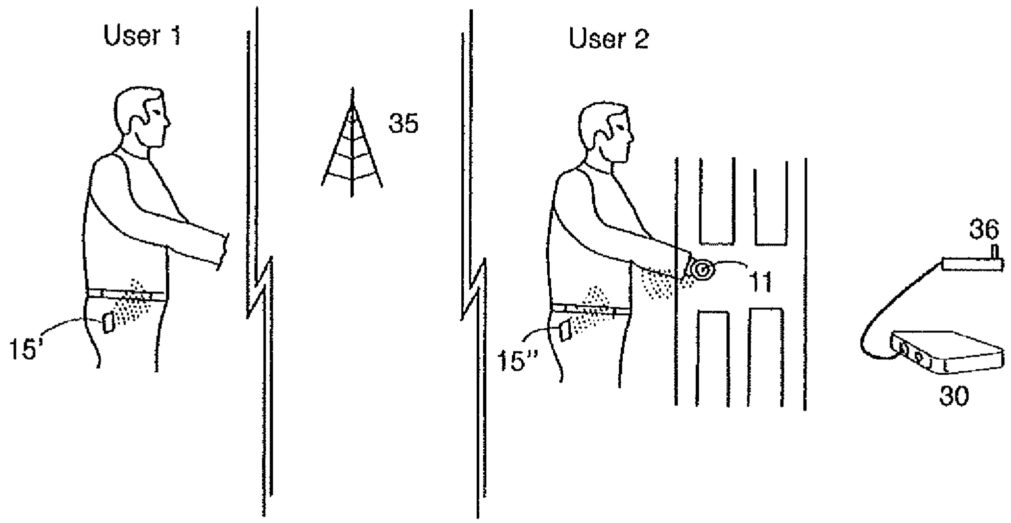
FIG. 8 is a diagram of a system showing the method of sending access control authorization from one remote access device to another in accordance with the invention.

The present invention lends itself to a process for transferring one-time, limited time, or permanent use Passive Keyless Entry (PKE) token key codes to a cellular or other wireless mobile remote access device 15' for use with PKE access control devices, such as lock 11 for example. Reference is now made to FIG. 8. In one exemplary, but non limiting embodiment, a first user has a first remote access device 15' embodied in a mobile communication device that is PKE enabled and is known to lock 11 as an authorized user. A second user has a second remote access device embodied in a mobile communication device 15" that is PKE enabled, but is not authorized for use with lock 11. Both users can communicate locally with lock 11 via a wireless Bluetooth Low Energy network as discussed above for example. Furthermore, both users have the ability to communicate with each other via a cellular network 35 as known in the art, or other wireless communication and as a result have an almost unlimited range.

The authorized user of lock 11, chooses to send an unauthorized user an authorized token for the lock 11 by way of a mobile application 17' on authorized remote access device 15' to unauthorized remote access device 15". The authorized user can select the option within mobile application 17' on authorized remote access device 15' for a one-time, limited time, or permanent token to send to unauthorized remote access device 15".

In one exemplary, but non limiting embodiment, the authorization credentials are transmitted from the authorized remote access device 15' to the currently unauthorized remote access device 15" via the cellular network 35. Now unauthorized remote access device 15" stores and makes use of the authorization credentials and becomes an authorized user of the lock 11. Another embodiment can be that authorized remote access device 15' sends a request for information to unauthorized remote access device 15" which responds to authorized remote access device with useful information such as device 15" Bluetooth address. This information is then transmitted from authorized remote access device 15' to the RPU 30 via the cellular network 35 to the internet, then from the internet to a home router 36 that is connected to the RPU 30. The RPU 30 then transfers identification information wirelessly to the lock 11, so that when now authorized remote access device 15" tries to access the lock 11, it is already a known remote access device, thus speeding up the initial access control process.

It should be noted that the use of the mobile phone cellular network was used by way of non-limiting example. The key code can be sent directly to another device via SMS text message, Email, or other data communication protocols. Additionally, the key codes can be sent to another device through server 34, or a server disposed in the communications network, which can also act as a master database. Additionally, the key code master database can allow a user to manage (send, receive, revoke) locks from a secured webpage. Additionally, the key code master database can be used to restore a devices key codes via a mobile application with verification upon a lost or damaged device.

This present invention also lends itself to revoking authorization. In a process to revoke a key where the key is a smart phone, tablet or the like, once a user decides to revoke a key code, the user may send a termination request directly to the remote access device key 15' being revoked, via the cellular network 35 using computer 25 or another computing device. If there is no response, the request is broadcast to users, for example, all users, in the "approved" network (i.e. users enrolled in the same lock 11). The request is stored in the background memory on their respective keys. Then when any authorized user is in range of the lock 11, the claimant request is activated and the key code of the requested revoked user is revoked from the lock, denying access to the revoked user. In another embodiment, the revoked key information can be sent via the cellular network 35, or through the Internet 28, to the RPU 30, then to the lock 11 to disable access.

With respect to power conservation and increased security methods for the lock 11, a remote access device 15 for example, may include the remote access application and a global positioning system (GPS) receiver 23. The GPS receiver may be used to track the location of remote access device 15 relative to the position of lock 11 and enable communication by the lock 11 only when the remote access device 15 is within range, by geo fencing for example. If the remote access device 15, i.e. mobile wireless communications device 15' is outside the range, as determined by the GPS receiver 23, remote access 15 may tell the lock 11, via the cell network 35 and Internet 28 through the RPU 30 to go into sleep mode or turn off. Additionally, or alternatively, the location of the mobile wireless communication device 15' may be determined via triangulation with wireless service provider base stations or towers, for example.

Alternatively, or additionally, the remote access device 15 or mobile wireless communications device 15' may wake up, determine a position, calculate a fastest time a user could be within range of the lock 11, then wake up again at that time and recalculate. When the user is within the range, it may enable the remote access application 17, and, thus communication for authentication or other purposes.

Figure 9:
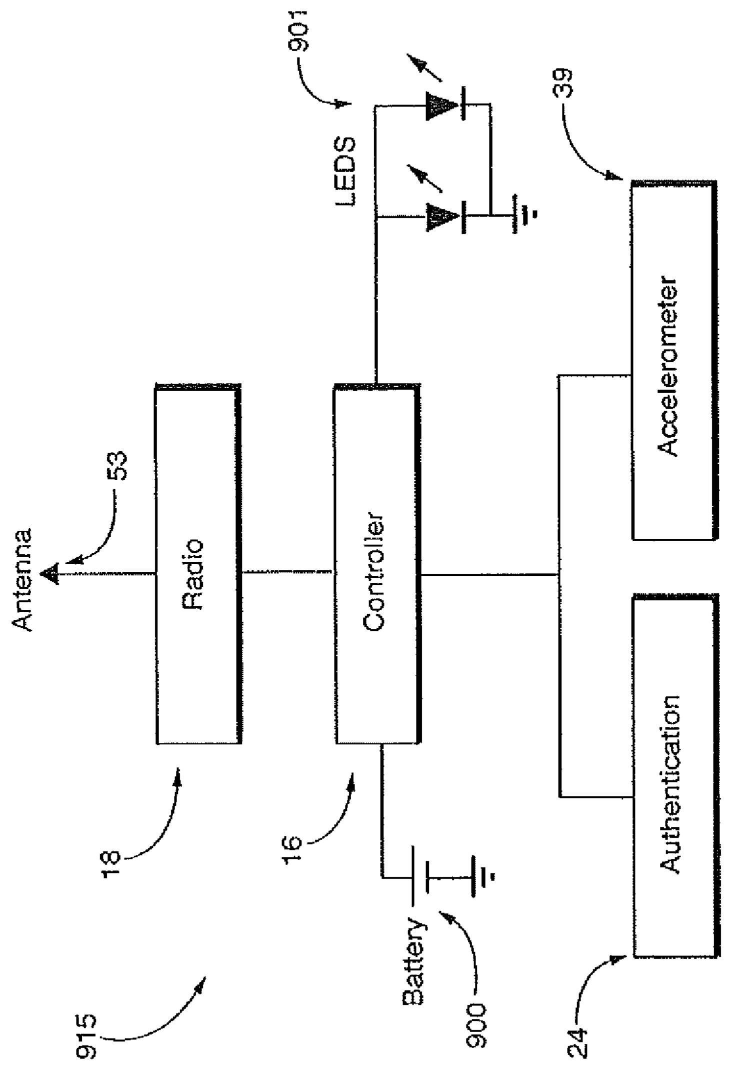
FIG. 9 is a circuit diagram of a remote access device constructed in accordance with still another embodiment of the invention.

Another method in which to conserve power consumption within remote access device 15 is to provide a wake-up mechanism internal to remote access device 15. Reference is now made to FIG. 9 in which a remote access device generally indicated as 15 constructed in accordance with another embodiment of the invention is provided. The circuitry as shown in FIG. 9 may be provided in any form factor known for a portable remote access device which as shown above is disposed within a cellphone, within a key, a fob, or any other portable entry device known in the art.

Remote access device 915 includes a radio signal generator 918 powered by a battery 900 to provide portability. Radio signal generator 918 generates a radio signal to be transmitted by an antenna 53 to be received at the lock 11 to gain access to the door in which a lock is provided as discussed above. A controller 16 controls operation of remote access device 15 and provides an input to radio signal generator 918. An authentication chip 24 provides an information input to the controller 16, such as security identification information, encryption information, and the like to be carried by the radio signal generated by radio 18 and recognized at the lock 11. In an alternative embodiment, the authentication process can be performed on the controller 16.

If radio 18 were to continuously output a radio signal even when the fob is not in use, it would exhaust battery 900 at a higher rate requiring frequent replacement, if replacement were even possible in some key fob constructions. A trigger mechanism is provided within key fob circuitry 915 to begin the creation of a radio signal by radio signal generator 918. In one preferred embodiment, an accelerometer 39 is provided within key fob circuitry 915 and outputs an acceleration signal to the controller 16 upon acceleration of the key fob 915. The acceleration signal is output to the controller 16 and the radio signal generator 918 is triggered to begin generating a radio signal. Radio signal generator 918 includes an onboard counter for measuring a predetermined time period during which transmission of the radio signal generator 918 occurs. The signal from the accelerometer 39 causes controller 16 to begin the transmission of the radio signal, and absent the acceleration signal, after the predetermined time period, the radio signal generator 918 does not operate. In this way, a radio signal is only produced when fob 15 is moving; such as when a person is in motion and approaches a lock carrying the fob for example, and not producing a radio signal when someone removes the key fob 15 from their pocket and sets it down on a table for example.

In one embodiment, light emitting diodes (LED) 901 are provided for providing a visual signal to a user of key fob circuitry 915. By way of example, LED 901 may be powered during transmission of the radio signal by radio signal generator 918, or may indicate a low battery condition.

By use of key fob circuitry 915, battery life is increased by limiting the transmission of the advertising radio signals to times when remote access device 15 is in motion. This also increases security if the user were to leave their keys near the lock 11, but just on the inside of the door. If the key were in a bowl or on a table near the door as often done, no motion would be sensed and the radio signal would not be triggered so there would be no false acceptance of an outside user resulting from the transmission of the radio signal while the key is on an interior side of the lock.

Figure 10:
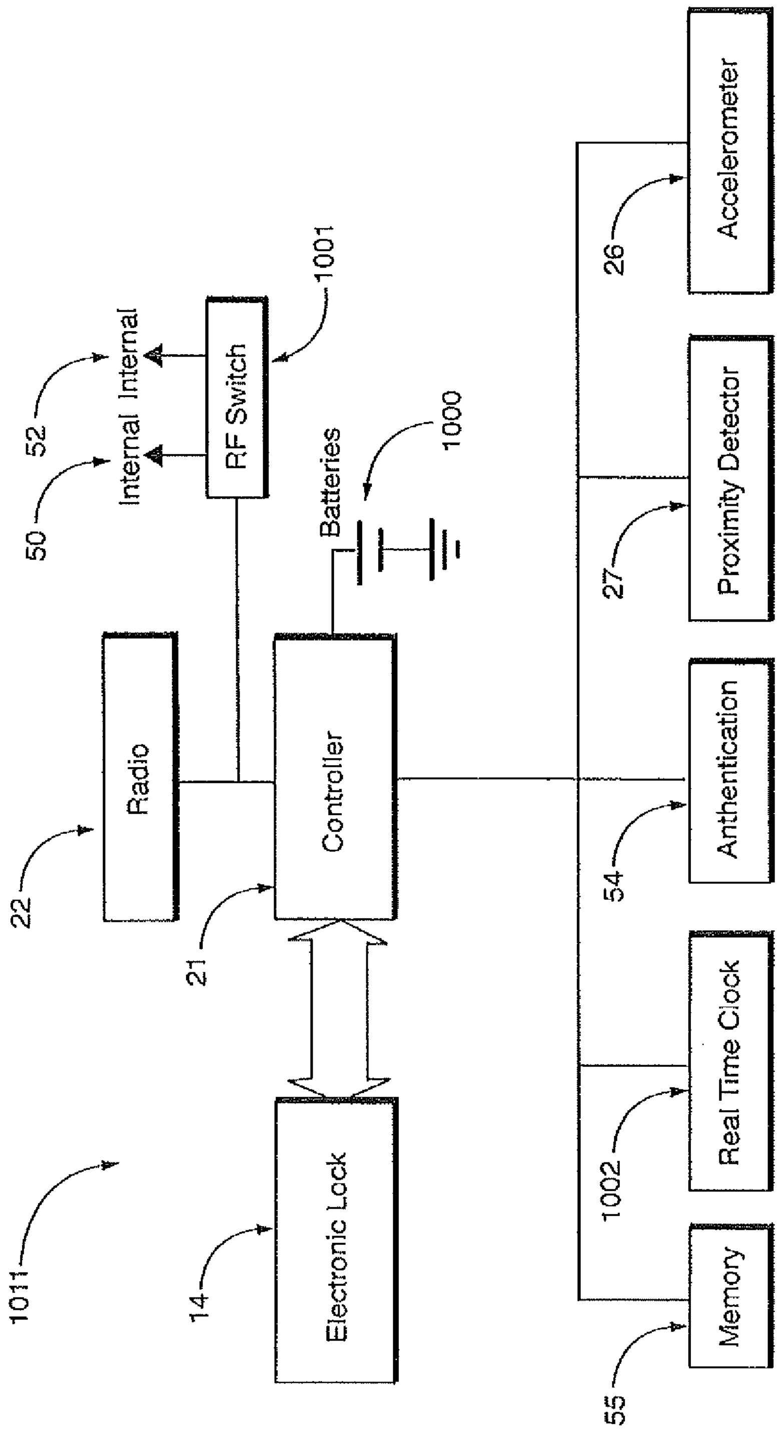
FIG. 10 is a circuit diagram of a PKE lock constructed in accordance with another embodiment of the invention.

Reference is now made to FIG. 10 in which a circuit for a lock, generally indicated as 1011, having a proximity sensor triggered wake-up operation is provided. Lock circuit 1011 includes a connection to an electronic lock 1014 mounted within a door. Electronic lock 1014 is controlled by signals output by a controller 21. The lock circuit 1011 also includes a radio signal generator 1022 for communication with remote access devices 15. The circuitry 1011 is powered by batteries 1000. The radio 1022 receives radio signals from an internal antenna 50 and an external antenna 52. These antennas to the radio 1022 may be controlled by a RF switch 1001 which switches between the internal antenna 50 and external antenna 52. For the purposes of this description, internal is a direction facing within the dwelling that includes the door in which lock 11 is disposed while external is the outwardly facing direction outside of the dwelling or structure which contains the door in which the lock is disposed. The external antenna 52 may be disposed on an external side of the door.

The Radio 1022 operates under the control of a controller 21, memory 55, accelerometer 26, authentication unit 54, real time clock 1002, and proximity detector 27. During operation, controller 21 is dormant, not actively controlling bolt 14 or electronic lock 1014, so it maintains its current condition until acted upon. Proximity detector 27 may be a capacitance detector as discussed above. Proximity detector 27 outputs a presence signal 10 when the proximity of a user is detected, to radio controller 21 to wake up radio 22 to begin the lock or unlock operation.

Figure 11:
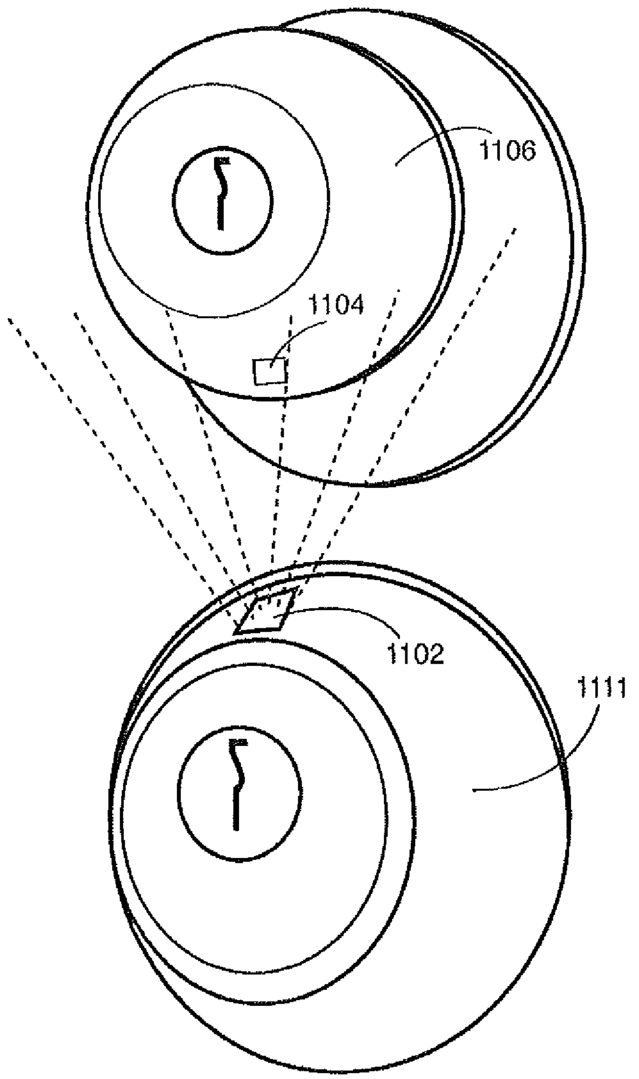
FIG. 11 is a schematic diagram of a trip light circuit for sensing the presence of a user in accordance with the invention.

It should be noted, that proximity detector 27 takes the form of a capacitance detector. However, as seen in FIG. 11, proximity detector 27 may include an LED 1102 and photodetector circuit 1104 between a handle 1106 and lock 1111 to form a trip light circuit. In this way, a user touches either one of handle 1102 or lock 1111, the user blocks the light path, breaking a light circuit as known in the art to signal the presence of the user.

Alternatively, the proximity detector 27 may also be a near field detector, a magnetic field detector, or even a radio signal detector for detecting the signal from a remote access device such as remote access device 15 as it is within close proximity of lock 11. In yet another embodiment, proximity detector 27 may take the form of a second lock, or handle, such as on a screen or storm door. Activation of the second lock is detected by proximity detector 27 which outputs a presence signal.

Lock circuitry 1011 also includes a memory 55 for storing data such as recognition information for authorized users or even periods of operation corresponding to specific users. By way of example, staff at a facility may only be provided access during their shift occurring at a known predetermined time. Memory 55 may also store active time periods of the day such as morning, or afternoon, when lock 11 is most in use.

A real time clock 1002 provides a real time output to controller 21 which in conjunction with access times stored in memory 55 determines when to provide access for certain authenticated users, discussed in more detail below, or when to stay on such as during known busy time periods to eliminate any operating delays. For example, between the hours of 8:00 and 9:00 when people may be showing up for work, or in a residential setting, the hours of 2:00 to 4:00 when children are returning from school, one may want the radio 22 to be broadcasting or listening at a faster rate to eliminate any delay in the operation of locking or unlocking the door.

The Authentication chip 54 creates public and private keys to be used by the controller 21 to authenticate and confirm the identity of the authorized remote access devices 15. The authentication unit 54 which includes encryption data for encrypting communications transmitted by radio 1022 or unencrypting messages received at either one of the antennas 50 or 52.

During operation, a user will approach or touch lock 11 to be detected by proximity detector 27 sending a user interaction signal to the controller 21. The radio 1022 will receive signals from a remote access device 15 at one or both of antennas 50 and 52. The received signals will be processed by the controller 21 to determine position and location as described above. Additionally, the controller verifies the remote access device 15 is authorized for access at that time as determined by utilizing the real time clock 1002 and data stored in memory 55. If access is permitted, or permitted as a function of time of day, then the actual signal received by the radio 1022 will be authenticated utilizing the authentication chip 54.

If the radio signal is recognized by the controller 21, the controller 21 will lock or unlock the electronic lock 14.

An accelerometer 26 may also provide an input to the radio 22 via the controller 21. An accelerometer 26 embedded in the door senses when the door is open or closed, or even experiences vibration such as a knock. In the absence of authorization as a function of memory unit 55 working with the real time clock 1002 and/or authentication processing utilizing authentication chip 54, the triggering of accelerometer 26 is an indication of an unwanted person at the door or even a break-in. In one embodiment, if a signal is received from accelerometer 26 in the absence of other authorizing indicia, then the controller 21 may send a signal via the radio 1022 along either one of internal antenna 50 or external antenna 52 to remote access device 15 or RPU 30 to cause an alert to be sent to a selected user.

The wireless access system 10 may be used to augment multi-factor authentication, e.g. use with a biometric identifier, personal identification number (PIN) code, key card, etc. The wireless access system 10 may also allow simultaneous multiple authentication of remote access device, for example, mobile wireless communications devices. More particularly, the wireless access system 10 may require a threshold number of authorized remote access devices 15 to be present at a same time for authentication to succeed.

The wireless access system 10 advantageously may provide increased security, for example. More particularly, the wireless access system 10 may force the user to authenticate in addition to authorization, via the remote access device 15 before the door can be opened. For example, the remote access device 15 may include an authentication device 24 for authentication via a biometric, password, PIN, shake pattern, connect-the-dots, or combination thereof, for example, prior to accessing the lock 11. In the case of the remote access application 17 on a mobile wireless communications device, for example, the application may have multiple security levels to enable these features, as will be appreciated by those skilled in the art.

With respect to security features, by using proximity sensors, switches, or the like, the wireless access system 10 may indicate whether a user locked the door, for example. When a user locks the door, for example, the remote access application 17 may log "Lock" with a time stamp so that it may be tracked and checked on the remote access device 15, i.e. the mobile wireless communications device, for example. The wireless access system 10 may include a sensing device 26 for example, an accelerometer to track door openings, for example. Based upon the accelerometer, data may be provided through the application or via the Internet or other network, for example. The sensing device 26 may be another type of device, for example, a touch sensor.

In one advantageous security feature, when the door is opened, or an attempt is made to open the door, which may be detected by the accelerometer 26 or other door opening determining methods, as will be appreciated by those skilled in the art, known, and even previously revoked, remote access devices 15 in range and/or discoverable devices, may be recorded along with a time stamp. This may capture an unauthorized user, for example.

Another advantageous feature of the wireless access system 10 may allow authorized visits, for example. More particularly, an authorized visit may be enabled by a 911 dispatcher or other authorized user to allow special or temporary access by the smart phone of a normally unauthorized user, for example. The wireless access system 10 may keep a log/audit trail. Approval may be granted by trusted a friend or special authority, for example, emergency medical services, a fire department, or a police department.

The wireless access system 10 may also include a security feature whereby when a threshold time has elapsed, the wireless access system may ignore a remote access device 15 in range. This advantageously reduces or may prevent unauthorized access that may occur from leaving a remote access device 15 that is authorized inside near the door. A timeout function (via a timer, not shown) may additionally be used in other undesired entry scenarios. The wireless access system 10 may also log all rejected pairing attempts, as will be appreciated by those skilled in the art.

The wireless access system 10 may also include a revocable key security feature. For example, the wireless access system 10 may include both revocable and non-revocable keys. If, for example, the wireless access system 10 is unable to access the server 34 to verify keys, for example, the wireless access system may force the application 17 on the remote access device 15, for example, to check the servers. If the wireless access system 10 is unable to connect or verify the keys, access is denied.

The identification of remote access device may be stored in memory 55 or at server 34, or computer 25. The status of the key as a one-time key, or limited duration key may also be stored. During the authentication process, lock 11 may compare the identification and/or password information with information stored within system 10 to determine whether access has been revoked or expired.

For example, the revocable key feature may be particularly advantageous to keep an old boyfriend, for example, who is aware that his key is being revoked from being able to turn off his remote access device 15 so that the key is not deleted. However, a wireless connection for the remote access device 15 may be a prerequisite to access in some instances.

As will be appreciated by those skilled in the art, the wireless access system 10 has the ability to transfer a key from one remote access device 15 to another with the remote access application 17, for example. It may be desired that these keys be revocable in some configurations. However, if the remote access device 15 with the key to be revoked is not accessible via the network 28, then revocation may not be guaranteed if the lock 11 is offline, for example. The wireless access system 10 advantageously addresses these challenges.

A proximity detection feature may be included in the wireless access system 10, and more particularly, the remote access device 15 may use a magnetic field sensor, such as, for example, a compass in mobile wireless communications device, as a proximity sensor to obtain a more uniform approach/departure distance calibration. A magnetic pulse or pulse sequence may be used in the lock 11 to illuminate a magnetic flux sensor in the remote access device 15 to establish proximity.

Additionally, the remote device 15, for example, a mobile wireless communications device or mobile telephone, may be qualified using both radio frequency (RF) and audio, for example. The remote access device 15 may be a source or sink of audio to help qualify proximity.

In another embodiment, as an alternative to a human driven lock, as noted above, a turn-tab (not shown) may be included that will "flip out" of the front of the lock 11 when pressed to allow the user to turn the lock on an un-powered deadbolt 14. It may be desirable that the surface area be no larger than a standard key, for example. The user pushes the turn-tab back into the lock face when done. The turn-tab may alternatively be spring loaded, for example.

In another embodiment, the turn-tab (not shown) may be added to a powered lock, for example the lock 11 described above. This is may be useful to help force 'sticky' locks, for example, as will be appreciated by those skilled in the art. This may also allow the user to give a manual assist to the motor in case of a strike/cleadbolt 14 misalignment. This may also allow for operation in a low battery situation, for example. The turn-tab may be particularly useful in other situations.

Additionally, one of the deadbolts may have a traditional key backup as it may be needed for emergencies, for example, while the remaining deadbolts on a house may be keyless. This may eliminate the need to match physical keys on multiple deadbolts, and may reduce the cost for additional deadbolts.

The wireless access system 10 may also include an additional access feature. For example, with the RPU 30 connected to the Internet 28 through the home router 36, this provides access to the server 34 for example, it may be possible to have the lock 11 unlock via a command from the RPU 30 through the internet. In other words, the lock 11 could be opened for users who don't have a remote access device 15. More particularly, they could call a call center or service that could unlock the lock 11 via the Internet 28, for example, or via other wireless communications protocol. Also, an authorized user could provide this action as well. Additionally, fire/police could gain access by this method if the lock owner opts-in to this service. As will be appreciated by those skilled in the art, alternatively, a command could be sent from the remote access device 15.

The wireless access system 10 may also include an activation indication. For example, the remote access device 15 can signal the operator via an auditory tone, vibration or other indication when the lock is activated. This may help communicate actions to the user to reduce any confusion.

The wireless access system 10 may also include an additional security feature. For example, the wireless access system 10 may use an additional authentication channel, for example, via a WLAN, WiFi, or other communication protocol, either wired or wireless, with the remote access device 15. This may improve authentication and make spoofing considerably more difficult, as will be appreciated by those skilled in the art.

As another security feature of the wireless access system 10, if cell service and data service, for example, if the remote access device 15 is a mobile phone, are turned off, remote access application may consider this a threat related to key revocation and authentication may not be approved.

Also, the lock 11 may include a radar device, or a radar device may be coupled adjacent the lock to detect the locations of the entrant by facing outward in its sweep to resolve inside/outside ambiguity, for example. If the radar does not detect an entrant, then by default the holder of the remote access device is inside and the lock is not activated.

The lock 11 includes an interior facing directional antenna 50 and a an external facing directional antenna 52. Each is operatively coupled to the radio 22 to send signals to, and listen for signals from, remote access devices 15. If a remote access device 15 is on the interior of the lock, then the interior facing directional antenna 50 communicates with remote access device 15, and the signal strength sensed by directional antenna 50 will be greater than the signal strength sensed by directional antenna 52 (which may be no sensed signal). Lock 11, and in turn system 10, determine that remote access device is inside the home, dwelling or structure. Conversely, if remote access device 15 is exterior of the lock, exterior facing directional antenna 52 communicates with remote access device 15 and the signal strength at directional antenna 52 is greater than the signal strength received at directional antenna 50. System 10 determines that remote access device 52 is outside of the dwelling and operates as discussed above. The lock 11 compares the signals from interior facing directional antenna 50 and exterior facing directional antenna 52 to confirm the location of remote access device 15 prior to enabling the remote access device 15 to control lock 11. This prevents undesired unlocking if an authorized user is inside the door.

A mechanical or zero/low-power tilt sensor may be configured to detect break-in events, for example to the lock 11. Upon a detected break-in, the lock 11 activates and thereafter communicates to the RPU 30 to report an intruder alert. The lock 11 may also store information, in a memory, for example, if home-connect plugin is off-line.

Indeed, while the different components of the wireless access system 10 have been described with respect to a wireless protocol, it will be appreciated by those skilled in the art that the components may communicate via a wired network and protocols or a combination of wired and wireless networks. Additionally, while Bluetooth, Bluetooth Low Energy, and WLAN (i.e. WiFi) has been described herein as wireless protocols of particular merit, other wireless protocols may be used, for example, Zywave, ZigBee, near field communication (NFC), and other wireless protocols.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the invention.

What is claimed is:

1. An access device for a wireless access control system for a door, the wireless access control system comprising a lock assembly carried by the door remote from the access device and comprising a lock, lock wireless communications circuitry, and a lock controller coupled to the lock and the lock wireless communications circuitry, the access device being remote from the door and comprising:

an accelerometer configured to sense an acceleration of the access device;

remote access wireless communications circuitry configured to communicate directly with the lock wireless communications circuitry;

a geographical positioning system configured to generate geographical location data corresponding to a geographical location of the access device; and a remote access controller configured to cooperate with said remote access wireless communications circuitry and said geographical positioning system to receive a lock signal from the lock controller when the access device is within a threshold distance from the lock assembly, and wirelessly transmit, based upon receipt of the lock signal, a command comprising the geographical location data to switch the lock between the locked and unlocked positions based upon the sensed acceleration from said accelerometer and the geographical location data.

2. The access device of claim 1, wherein said remote access controller is configured to transmit the command for a threshold time period after the sensed acceleration.

3. The access device of claim 1, wherein the lock controller is configured to cooperate with the lock wireless communications circuitry to wirelessly communicate at a higher communication rate based upon the geographical location data.

4. The access device of claim 1, further comprising a housing carrying said accelerometer, said remote access wireless communications circuitry, and said remote access controller.

5. The access device of claim 4, further comprising a display carried by said housing and coupled to said remote access controller.

6. The access device of claim 4, further comprising an input device carried by said housing and coupled to said remote access controller.

7. The access device of claim 1, wherein said remote access controller is configured to cooperate with said remote access wireless communications circuitry to perform at least one cellular communication function.

8. An access device for a wireless access control system for a door, the wireless access control system comprising a lock assembly carried by the door remote from the access device and comprising a lock, lock wireless communications circuitry, and a lock controller coupled to the lock and the lock wireless communications circuitry, the access device being remote from the door and comprising:

a housing;

an accelerometer carried by said housing and configured to sense an acceleration of the access device;

remote access wireless communications circuitry carried by said housing and configured to communicate directly with the lock wireless communications circuitry;

a geographical positioning system configured to generate geographical location data corresponding to a geographical location of the access device; and a remote access controller carried by said housing and configured to cooperate with said remote access wireless communications circuitry and said geographical positioning system to receive a lock signal from the lock controller when the access device is within a threshold distance from the lock assembly, and wirelessly transmit, based upon receipt of the lock signal, a command comprising the geographical location data to switch the lock between the locked and unlocked positions based upon the sensed acceleration from said accelerometer, the command being wirelessly transmitted for a threshold time period after the sensed acceleration and the geographical location data.

9. The access device of claim 8, wherein the lock controller is configured to cooperate with the lock wireless communications circuitry to wirelessly communicate at a higher communication rate based upon the geographical location data.

10. The access device of claim 8, wherein said remote access controller is configured to cooperate with said remote access wireless communications circuitry to perform at least one cellular communication function.

11. A method of wireless access for a wireless access control system for a door, the wireless access control system comprising a lock assembly carried by the door remote from the access device and comprising a lock, lock wireless communications circuitry, and a lock controller coupled to the lock and the lock wireless communications circuitry, the method comprising:

using remote access wireless communications circuitry of an access device remote from the door to communicate directly with the lock wireless communications circuitry, receive a lock signal from the lock controller when the access device is within a threshold distance from the lock assembly, and wirelessly transmit a command comprising geographical location data corresponding to a geographical location of the access device based upon a geographical positioning system of the access device to switch the lock between the locked and unlocked positions based upon a sensed acceleration of the access device from an accelerometer of the access device and the geographical location data.

12. The method of claim 11, wherein the command is wirelessly transmitted for a threshold time period after the sensed acceleration.

13. The method of claim 11, wherein the lock controller is configured to cooperate with the lock wireless communications circuitry to wirelessly communicate at a higher communication rate based upon the geographical location data.

14. The method of claim 11, wherein the remote access wireless communications circuitry comprises cellular communications circuitry.

* * * * *